(12) United States Patent
Fischer-Frühholz et al.

(10) Patent No.: US 10,226,742 B2
(45) Date of Patent: Mar. 12, 2019

(54) FILTER MODULE AND FILTER UNIT

(75) Inventors: Stefan Fischer-Frühholz, Bovenden (DE); André Pastor, Goettingen (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 2 days.

(21) Appl. No.: 12/384,255

(22) Filed: Apr. 2, 2009

(65) Prior Publication Data

US 2009/0266756 A1    Oct. 29, 2009

(30) Foreign Application Priority Data

Apr. 23, 2008    (DE) .................. 10 2008 020 478

(51) Int. Cl.
| | | |
|---|---|---|
| C02F 1/44 | (2006.01) | |
| B01D 61/14 | (2006.01) | |
| B01D 63/10 | (2006.01) | |
| B01D 63/12 | (2006.01) | |

(52) U.S. Cl.
CPC ............ *B01D 63/10* (2013.01); *B01D 63/12* (2013.01); *B01D 61/14* (2013.01); *B01D 2311/2626* (2013.01); *B01D 2313/44* (2013.01); *B01D 2319/02* (2013.01); *C02F 1/444* (2013.01)

(58) Field of Classification Search
None
See application file for complete search history.

(56) References Cited

U.S. PATENT DOCUMENTS

| | | | | |
|---|---|---|---|---|
| 1,872,430 A | * | 8/1932 | Ericson | ................. 210/439 |
| 3,726,407 A | | 4/1973 | Weyand | |
| 4,678,578 A | * | 7/1987 | Nodes et al. | ............. 210/445 |
| 4,990,248 A | * | 2/1991 | Brown et al. | ............. 210/136 |

FOREIGN PATENT DOCUMENTS

| | | |
|---|---|---|
| DE | 38 16434 A1 | 11/1988 |
| DE | 197 11 083 A1 | 9/1998 |
| WO | WO 88/09693 | 12/1988 |

* cited by examiner

*Primary Examiner* — Krishnan S Menon
(74) *Attorney, Agent, or Firm* — Gerald E. Hespos; Michael J. Porco; Matthew T. Hespos

(57) ABSTRACT

Filter module and filter unit with an inlet for medium that is to be filtered, and with an outlet for the permeate, with at least one filter sheet, a first spacer adjacent to the media side and a second spacer adjacent to the permeate side, the spacers being designed with a draining action, and the first spacer being connected to an inlet and the second spacer to an outlet, wherein the at least one filter sheet forms a first filter unit together with the two adjacent spacers, the filter sheet is designed as a single filter or a filter stack, the first spacer is designed to be impermeable to liquid on its outer face directed away from the filter sheet and is sealed off at its boundary to the outlet end, and the second spacer is designed to be impermeable to liquid on its outer face directed away from the filter sheet and is sealed off at its boundary to the inlet end.

16 Claims, 5 Drawing Sheets

FILTER MODULE AND FILTER UNIT

BACKGROUND OF THE INVENTION

Field of the Invention

The invention relates to a filter module, in particular for arrangement in a filter capsule with an inlet for medium that is to be filtered, and with an outlet for the permeate, with at least one filter sheet, a first spacer adjacent to the media side and a second spacer adjacent to the permeate side, the spacers being designed with a draining action, and the first spacer being connected to the inlet and the second spacer to the outlet.

The invention further relates to a filter unit for a filter module with at least one filter sheet, a first spacer adjacent to the media side and a second spacer adjacent to the permeate side, the spacers being designed with a draining action.

Description of the Related Art

A filter module or membrane adsorber module composed of sheet filter elements for arrangement in a filter housing is known from DE 38 16 434 A1. The filter housing comprises, at the top in the vertical direction, an inlet for medium that is to be filtered, and, at the bottom in the vertical direction, an outlet for the permeate. The filter module comprises two rows or two stacks of filter blanks from filter sheets and, arranged between these, support elements or spacers that have a draining action. Each two neighboring filter blanks and a spacer lying between them are held by a sealing element in the form of a curable plastic composition applied in the liquid state, while the opposite edges of the two filter blanks joined on the outside remain open to an inner fluid chamber in the plane of the spacer. Two mutually stacked blanks of filter sheets, with a spacer or drainage sheet lying between them and with an edge connection at one side, are in each case designed as prefabricated base elements which are stacked with a spacer lying between them. The mutually facing filter sheets of two adjacent base elements are connected to each other on the inner side opposite the edge connection. The filter sheets can have a pressure safety means on the outside which, in the form of an envelope, stabilizes the entire membrane adsorber module in its circumferential direction. The envelope can also contain a membrane filter.

A disadvantage of the known filter module or membrane adsorber module is the fact that it has been found in principle that the multi-layer structure of the individual filter sheets is relatively complicated and expensive.

A further disadvantage of known filter housings or capsules is that their inner wall forms the inlet or outlet channel of the medium or of the filtrate/permeate.

Moreover, DE 197 11 083 A1 discloses a filter module or membrane adsorber module for arrangement in a membrane adsorber capsule which has an inlet for medium to be filtered and an outlet for the permeate. The adsorber module is designed as an adsorption membrane which is wound up into a hollow cylinder. The membrane adsorber module has an annular gap directed inward to a core and an annular gap directed outward to the wall of the membrane adsorber capsule. The membrane adsorber module is closed off at each of the end faces by a sealing compound. Medium can be delivered via the inner annular gap and guided radially through the wall of the membrane adsorber module, and the permeate can be discharged via the outer annular gap.

A disadvantage is that, for scale-up, modules have to be connected in parallel or in series or, for scale-up and also scale-down, it is necessary to use membrane adsorber modules of different heights, together with outer casing tubes of different heights and correspondingly assembled cores. Scale-up and scale-down processes, although possible in principle, are thus made relatively complicated and expensive.

Particularly in system modules in series connection, scale-up is limited by too high a backpressure.

The object of the present invention is to make available a filter module and a filter unit which, on the one hand, have a relatively compact structure and are simple and inexpensive to produce, and for which, on the other hand, scale-up and scale-down are possible largely without limitation.

SUMMARY OF THE INVENTION

As regards the filter module for arrangement in a filter capsule, this object is achieved by the fact that the at least one filter sheet forms a first filter unit together with the two adjacent spacers, the filter sheet is designed as a single filter or a filter stack, the first spacer is designed to be impermeable to liquid on its outer face directed away from the filter sheet and is sealed off at its boundary to the outlet end, and the second spacer is designed to be impermeable to liquid on its outer face directed away from the filter sheet and is sealed off at its boundary to the inlet end.

By virtue of the fact that the filter sheet is designed as a single filter or a filter stack having on both sides a spacer which is designed with a draining action and which is sealed off on its outer face directed away from the filter sheet, a filter unit is obtained with integrated inflow and outflow channels, in other words in which the inlet and outlet channel is substantially separate from a surrounding filter housing, and the interior of the housing or capsule can be filled almost completely by the filter unit or by a filter module formed by the latter. In particular, the reduction in dead space means that the filtration and adsorption performance can be considerably improved.

The filter unit can be arranged in windings or can be designed as a reel and, compared to known filter units, has a substantially more compact structure. To build up capacity, it is not necessary to increase the number of filter layers. Scale-up is not limited by too high a backpressure. Moreover, almost any desired scaling is possible, as with columns.

The filter unit can be simply produced from a roll, with the start and end being sealed off in each case, for example welded. The filter sheet can preferably be designed as a filter stack. The filter unit or the web material with the spacers can be sealed off in the desired manner at the inlet and outlet sides. However, it is also possible for the sealing to be carried out only in the wound-up and installed state.

The design according to the invention results in a very large surface for very high through-flow. The filter capsules can be made much more compact than known filter capsules. There is also a greater binding capacity per unit of volume of a filter capsule compared to the known filter capsules.

According to a preferred embodiment of the invention, the spacers are made from a nonwoven material. At least the first spacer, on its outer face directed away from the filter sheet, has a film sealing it off. Preferably, the second spacer also has, on its outer face directed away from the filter sheet, a film that seals it off. In principle, however, during and upon winding-up, the film of the first spacer can also be used as a sealing film of the second spacer.

According to another preferred embodiment of the invention, several filter units, for example three, are provided, such that a staged serial arrangement can be realized in a single filter capsule. A first filter unit can be designed as a wound or rolled web, which has been wound around a core, for example. A second filter unit can be wound around the first filter unit, and a third filter unit can then in turn be wound around the second filter unit. The inlet end of the first filter unit is expediently sealed off relative to the second and third filter units, and the outlet end of the third filter unit is expediently sealed off in relation to the second and first filter units.

This results in series connection of three filter units within one filter capsule.

According to another preferred embodiment of the invention, the three filter units each have a different number of filters in the filter stack.

The different filter stacks permit a staged series connection in a single filter capsule.

According to another preferred embodiment of the invention, the number of filters in the filter stack of the second filter unit is half the number present in the filter stack of the first filter unit. The number of filters in the filter stack of the third filter unit is quarter the number present in the filter stack of the first filter unit. Three corresponding serially arranged strips of the different filter stacks could then serve as scale-down unit.

As regards the filter unit in connection with a filter module, the object is achieved by the fact that the spacers form, together with the filter sheet lying between them, a web-shaped base unit that can be wound up, the filter sheet is designed as a single filter or a filter stack, and at least the first spacer is designed to be impermeable to liquid on its outer face directed away from the filter sheet.

The web-shaped design of the filter unit permits simple and inexpensive production of a compact filter module.

According to a preferred embodiment of the invention, the second spacer is also designed to be impermeable to liquid on its outer face directed away from the filter sheet. This is preferably achieved by a liquid-impermeable film. The spacers are made from a nonwoven material.

According to another preferred embodiment of the invention, the second spacer and the filter sheet are designed to be impermeable to liquid at the upper edge of the base unit, and the first spacer and the filter sheet are designed to be impermeable to liquid at the lower edge of the base unit. In order to produce the base unit, the required length of web material simply has to be cut out from a roll and closed, for example welded, at the start of the web and at the end of the web, which is then already functional, i.e. the medium to be filtered can be admitted via the end face of the first spacer and the permeate can be discharged via the end face of the lower edge of the second spacer.

According to another preferred embodiment of the invention, the filters or single filters and the filter stacks are designed as depth filters and/or surface filters and/or adsorption filters.

The surface filters and/or adsorption filters can in particular be membranes.

According to another preferred embodiment of the invention, the single filters and the filter stacks are designed as membrane adsorbers.

The adsorbing filter sheet can additionally be covered on the admission side or discharge side with microporous or ultraporous non-adsorbent filter sheets in order to perform special filtration tasks, for example the separation of viruses, protein particles, etc.

However, the filters and filter stacks can also be designed as microfiltration or ultrafiltration filters.

Further features of the invention will become clear from the following detailed description and from the appended drawings in which preferred embodiments of the invention are depicted by way of example.

DETAILED DESCRIPTION OF THE PREFERRED EMBODIMENTS

Figure 1:
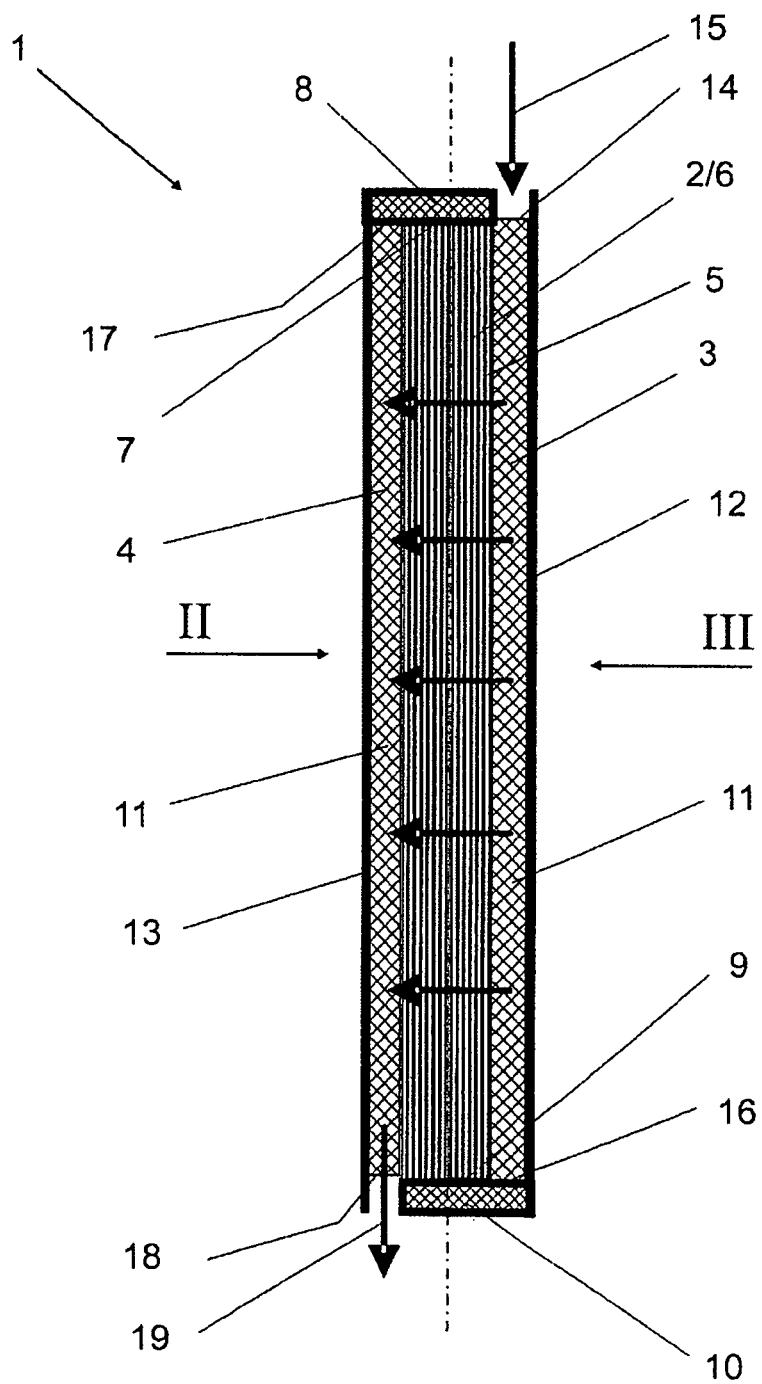
FIG. 1 shows, in an enlarged cross section, a front view of a filter unit designed as a membrane adsorber unit.
Figure 2:
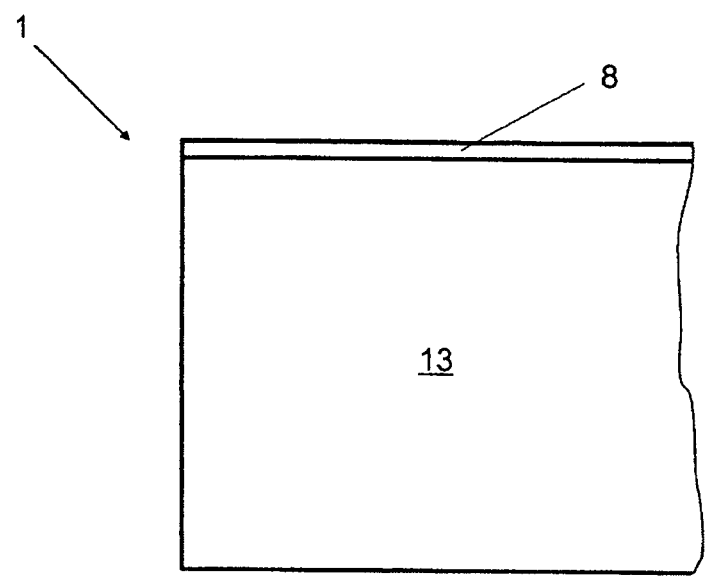
FIG. 2 shows a side view of the filter unit of FIG. 1 from direction II.
Figure 3:
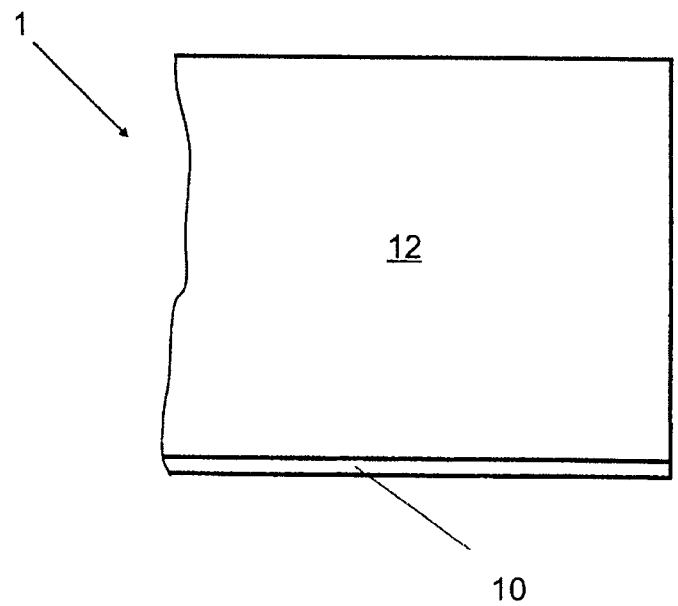
FIG. 3 shows a side view of the filter unit in FIG. 1 from direction III.

Turning to FIGS. 1-3, a filter unit 1 is composed principally of a filter sheet 2, a first spacer 3 and a second spacer 4.

The filter sheet 2 is composed of at least one (single) filter 5 or of a filter stack 6, which is composed of a multiplicity of filters 5. In the illustrative embodiment, the filters are designed as adsorbent membranes. The filter sheet 2 is adjoined on the media side by the first spacer 3 and on the permeate side by the second spacer 4. At its upper edge 7, the filter sheet is sealed off by a sealing compound 8 and, at its opposite, lower edge 9, the filter sheet is sealed off by a sealing compound 10.

The spacers 3, 4 are formed by nonwoven material 11 and, on their outer face directed away from the filter sheet 2, they are sealed off by a film 12, 13 that is impermeable to liquid. The first spacer 3 is not sealed off at its upper edge 14, such that a medium 15 to be filtered can be admitted to the first spacer 3 via the upper edge 14. At its lower edge 16 located opposite from the upper edge 14, the first spacer 3 is sealed off by the sealing compound 10.

The second spacer 4 is sealed off at its upper edge 17 by the sealing compound 10. At its lower edge 18 located opposite from the upper edge 17, the second spacer 4 is open, such that permeate 19 or eluate can run off.

The medium 15 to be filtered can be admitted to the filter unit 1 or membrane adsorber unit via the upper edge 14 of the first spacer 3 and can be conveyed transversely with respect to the filter 5 or filter stack 6, where it then enters as permeate 19 into the second spacer 4 and emerges at the lower edge 18 of the second spacer 4.

Figure 4:
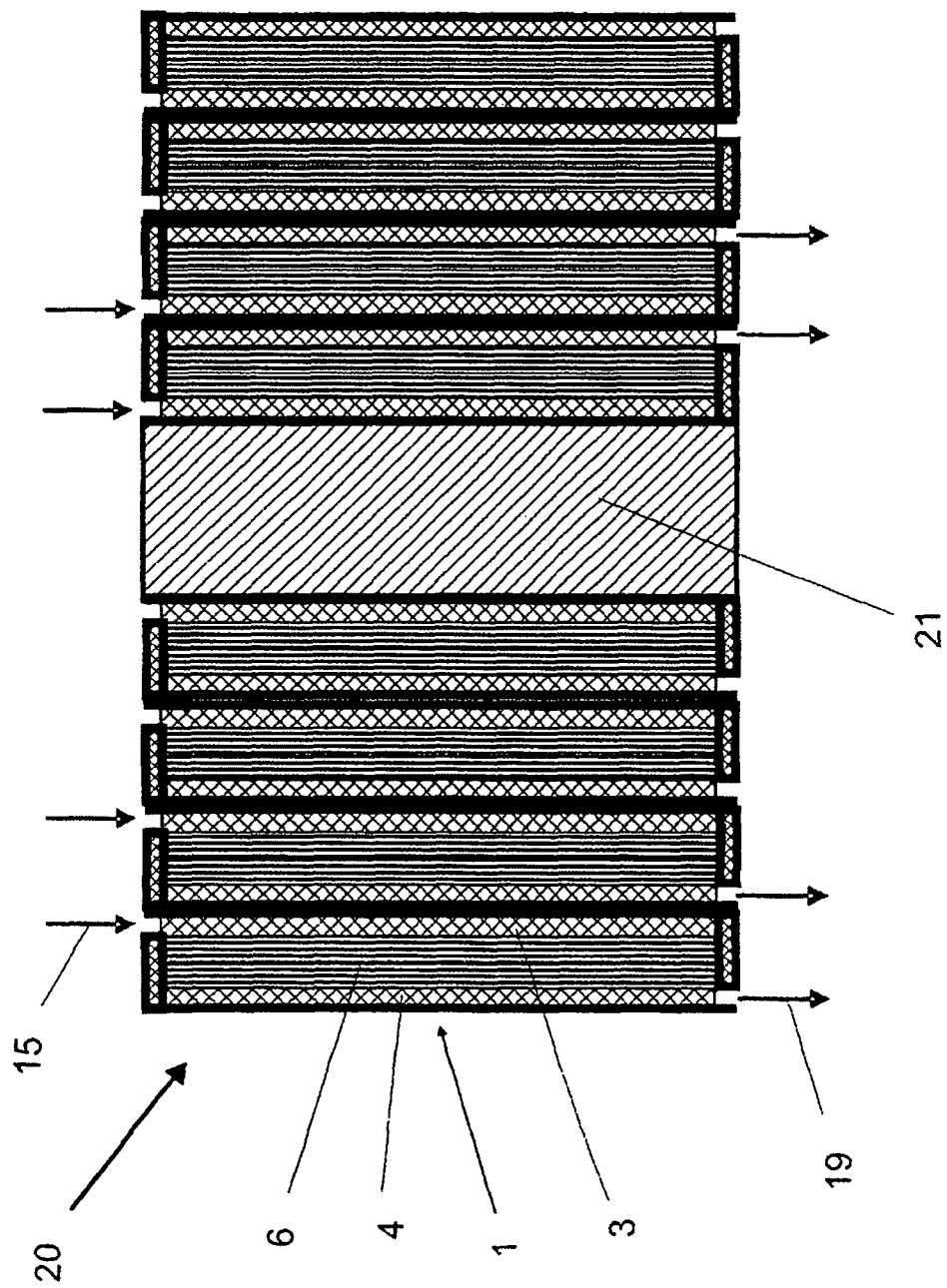
FIG. 4 shows a sectional side view of a filter module designed as a membrane adsorber module and composed of a filter unit wound around a core.
Figure 5:
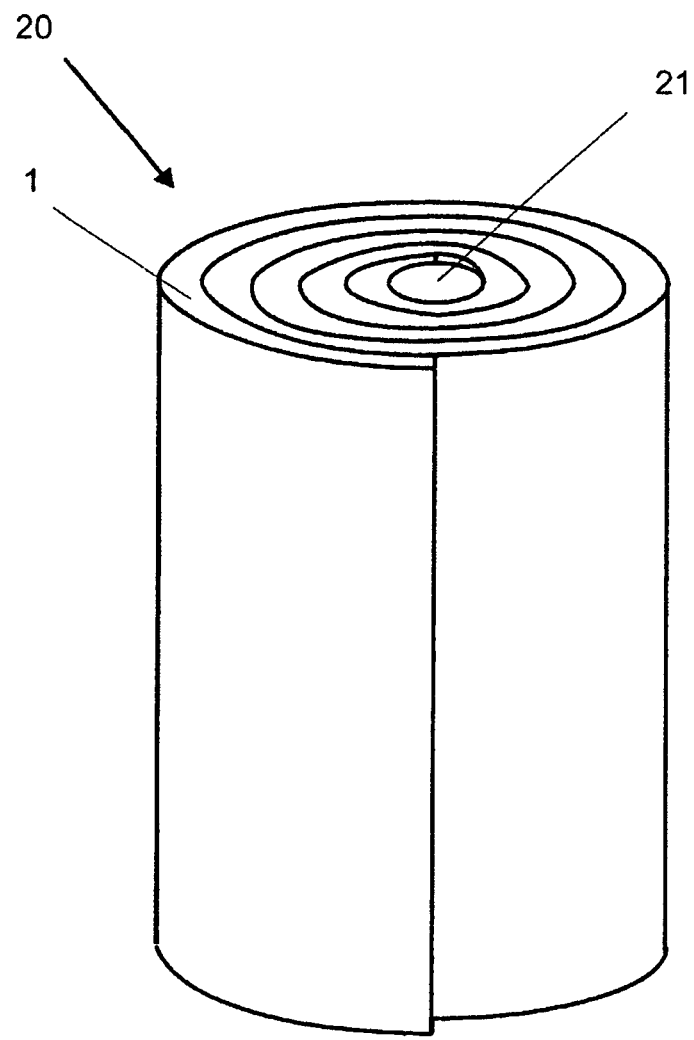
FIG. 5 shows a perspective view of a filter module or membrane adsorber module.

According to the embodiments in FIGS. 4 and 5, the filter unit 1 is designed as a filter module 20, which is composed of a filter unit 1 wound around a core 21.

Figure 6:
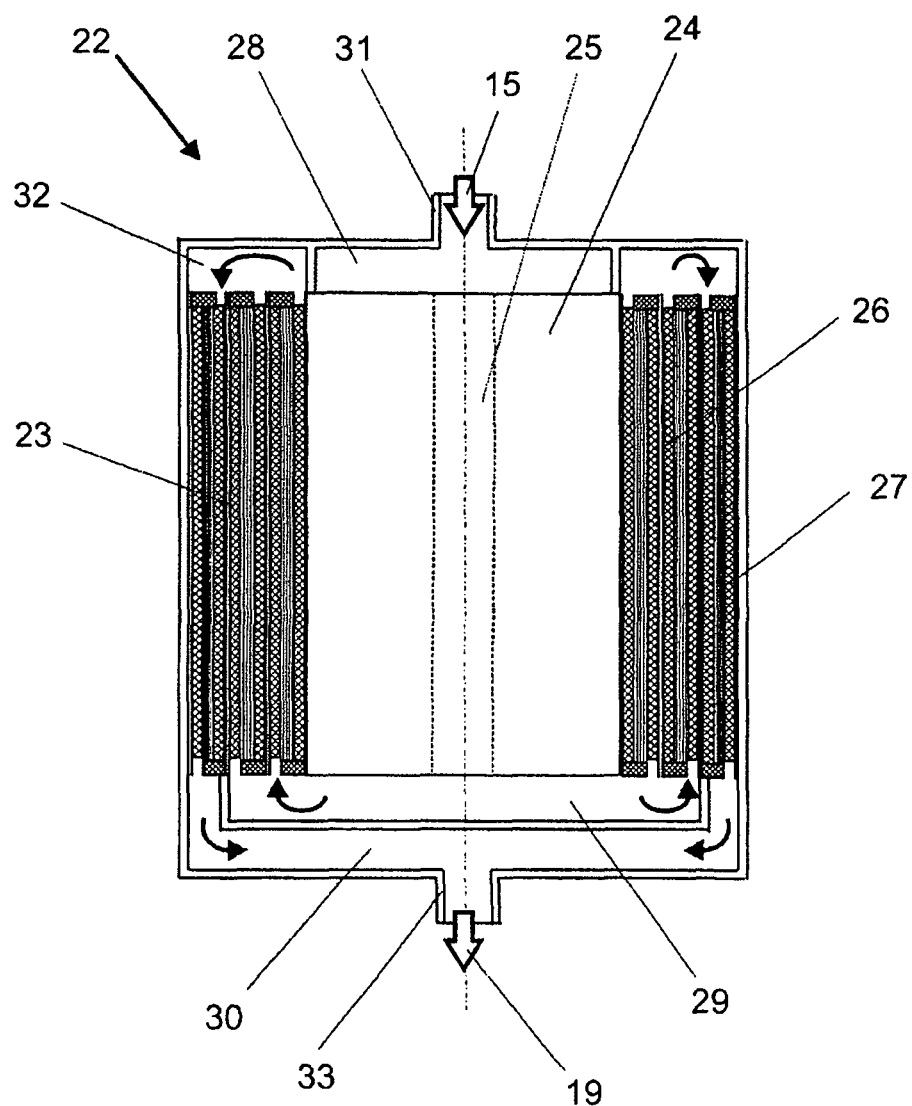
FIG. 6 shows a sectional side view of a filter capsule with a three-stage filter module, in which a first filter unit is shown unsectioned.

The embodiment in FIG. 6 shows a filter capsule 22 which comprises a three-stage filter module 23. In the illustrative embodiment, the filter capsule 22 is designed as a membrane adsorber capsule. The three-stage filter module 23 is composed of a first filter unit 24, which is designed like the filter unit 1 and is wound around a core 25, and of a second filter unit 26, which is wound around and encloses the first filter unit 24, and of a third filter unit 27, which is wound around and encloses the second filter unit 26.

To permit series connection of the filter units 24, 26, 27, the inlet space 28 arranged on the medium side upstream of the first filter unit 24 is sealed off from the second and third filter units 26, 27. The outlet space 29 arranged downstream of the first filter unit 26 in the direction of flow, in the lower area of the filter capsule 22, is sealed off from the permeate discharge space 30, likewise located at the bottom, of the third filter unit 27.

Medium 15 that is to be filtered is admitted through an inlet 31 of the filter capsule 22 into the inlet space 28. From the inlet space 28, the medium 15 that has been admitted passes through the first filter unit 24 and, in a first stage, emerges filtered at the lower end of the filter unit 24 into the outlet space 29. From the lower outlet space 29, the permeate of the first filter unit 24 enters vertically from below into the second filter unit 26 in order, in a second stage, to leave the latter at its upper end and enter a second inlet space 32, which is arranged upstream of the third filter unit 27, at the upper end thereof. From the second inlet space 32, the permeate of the second stage is conveyed into the third filter unit 27 in order to emerge, at the lower end of the latter, as permeate of the third stage and enter the permeate outflow space 30, from which it emerges as permeate 19 through an outlet 33 of the filter capsule 22.

The invention claimed is:

1. A filter module for arrangement in a filter capsule (22) with an inlet (31) for medium (15) that is to be filtered, and with an outlet (33) for permeate (19), the filter module including at least one fitter unit (1) having opposite first and second ends and comprising: at least one filter sheet (2) having opposite first and second surfaces, a first spacer (3) adjacent to the first surface of the at least one filter sheet (2) and being sealed off by a first film (12) that is impermeable to liquid covering a surface of the first spacer (3) facing away from the filter sheet (2), and a second spacer (4) adjacent to the second surface of the at least one filter sheet (2) and being sealed off by a second film (13) that is impermeable to liquid covering a surface of the second spacer (3) facing away from the filter sheet (2), a first sealing compound (8) covering the at least one filter sheet (2) and the second spacer (3) at the first end of the filter unit (1) while permitting access from the inlet (31) of the filter capsule (22) to the first spacer (3) at the first end of the filter unit (1), a second sealing compound (8) covering the at least one filter sheet (2) and first spacer (3) at the second end of the filter unit (1) while permitting egress from the second spacer (4) to the outlet (33) of the filter capsule (22) at the second end of the filter unit (1) to define an outlet, the spacers (3, 4) being designed with a draining action, the filter sheet (2) being designed as a single filter (5) or a filter stack (6).

2. The filter module as claimed in claim 1, wherein the spacers (3, 4) are made from a nonwoven material (11).

3. The filter module as claimed in claim 1, wherein the filter unit (1, 24) is a wound or rolled web.

4. The filter module as claimed in claim 3, wherein the filter unit (1, 24) is wound around a core (21, 25).

5. The filter module as claimed in claim 3, wherein a second filter unit (26) is wound around the first filter unit (24).

6. The filter module as claimed in claim 5, wherein the second filter unit (26) has a filter stack (6) with a different number of filters (5) than the first filter unit (24).

7. The filter module as claimed in claim 5, wherein a third filter unit (27) is wound around the second filter unit (26).

8. The filter module as claimed in claim 7, wherein the third filter unit (27) has a filter stack (6) with a different number of filters (5) than the first and second filter units (24, 26).

9. The filter module as claimed in claim 8, wherein the number of filters (5) in the filter stack (6) of the second filter unit (26) is half the number present in the filter stack (6) of the first filter unit (24).

10. The filter module as claimed in claim 8, wherein the number of filters (5) in the filter stack (6) of the third filter unit (27) is quarter the number present in the filter stack (6) of the first filter unit (24).

11. A filter unit (1) for a filter module (20, 23), the filter unit (1) having opposite first and second ends and comprising: at least one filter sheet (2) extending between the first and second ends and having opposite first and second surfaces, a first spacer (3) adjacent to the first surface of the at least one filter sheet (2) and being sealed off by a first film (12) that is impermeable to liquid covering a surface of the first spacer (3) facing away from the filter sheet (2), a second spacer (4) adjacent to the second surface of the at least one filter sheet (2) and being sealed off by a second film (131 that is impermeable to liquid covering a surface of the second spacer (3) facing away from the filter sheet (2), a first sealing compound (8) covering the at least one filter sheet (2) and the second spacer (3) at the first end of the filter unit (1) while permitting access to the first spacer (3) at the first end of the filter unit (1) to define an inlet, a second sealing compound (8) covering the at least one filter sheet (2) and first spacer (3) at the second end of the filter unit (1) while permitting egress from the second spacer (4) at the second end of the filter unit (1) to define an outlet, the spacers (3, 4) being designed with a draining action, wherein the spacers (3, 4) and the filter sheet (2) form a web-shaped base unit that can be wound up, the filter sheet (2) being designed as a single filter (5) or a filter stack (6).

12. The filter unit as claimed in claim 11, wherein the spacers (3, 4) are made from a nonwoven material (11).

13. The filter unit as claimed in claim 11, wherein the single filters (5) and the filter stacks (6) are designed as depth filters and/or surface filters and/or adsorption filters.

14. The filter unit as claimed in claim 13, wherein the surface filters and/or adsorption filters are membranes.

15. The filter unit as claimed in claim 14, wherein the membranes are membrane adsorbers.

16. The filter unit as claimed in claim 13, wherein the filters (5, 6) are microfiltration or ultrafiltration filters.

* * * * *